(12) United States Patent
Pisacreta

(10) Patent No.: US 9,359,063 B2
(45) Date of Patent: Jun. 7, 2016

(54) MULTI-DIMENSIONAL EXTENDING PROTECTIVE ARM

(71) Applicant: UNITED TECHNOLOGIES CORPORATION, Farmington, CT (US)

(72) Inventor: Pellegrino J. Pisacreta, Newtown, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 57 days.

(21) Appl. No.: 13/716,576

(22) Filed: Dec. 17, 2012

(65) Prior Publication Data

US 2014/0166835 A1 Jun. 19, 2014

(51) Int. Cl.
| | | |
|---|---|---|
| B64C 13/00 | (2006.01) | |
| B64C 9/22 | (2006.01) | |
| F02C 7/06 | (2006.01) | |
| F02C 7/22 | (2006.01) | |

(52) U.S. Cl.
CPC ... *B64C 9/22* (2013.01); *F02C 7/06* (2013.01); *F02C 7/222* (2013.01); *B64C 13/00* (2013.01); *F05D 2250/43* (2013.01)

(58) Field of Classification Search
USPC ............... 248/49, 51; 174/68.1, 69, 72 R, 95; 244/99.3, 99.2, 99.5, 134 C, 53 R
See application file for complete search history.

(56) References Cited

U.S. PATENT DOCUMENTS

| | | | | |
|---|---|---|---|---|
| 2,535,803 A | * | 12/1950 | Maack | 248/160 |
| 2,891,823 A | | 6/1959 | Galonska | |
| 2,937,839 A | * | 5/1960 | Randolph | 248/276.1 |
| RE24,982 E | * | 5/1961 | Schiring et al. | 403/63 |
| 3,515,067 A | * | 6/1970 | Min | 102/397 |
| 3,887,155 A | * | 6/1975 | Bertalot | 248/333 |
| 4,217,987 A | * | 8/1980 | Gattu et al. | 212/299 |
| 4,508,404 A | | 4/1985 | Frawley | |
| 4,715,077 A | * | 12/1987 | Shepheard | 14/71.5 |
| 4,932,686 A | | 6/1990 | Anderson, Jr. | |
| 6,394,396 B2 | * | 5/2002 | Gleine et al. | 244/198 |
| 6,494,636 B1 | * | 12/2002 | Mozena | 403/109.2 |
| 7,654,738 B2 | * | 2/2010 | Fink et al. | 378/194 |
| 7,677,499 B2 | * | 3/2010 | Weaver | 244/131 |
| 8,708,280 B2 | * | 4/2014 | Blanchard et al. | 244/131 |
| 2005/0232741 A1 | | 10/2005 | Laenge | |
| 2011/0303792 A1 | * | 12/2011 | Blanchard et al. | 244/131 |
| 2012/0187254 A1 | | 7/2012 | Wollaston | |

FOREIGN PATENT DOCUMENTS

DE 202011052545 U1 * 4/2012
FR 2950749 A1 4/2011

OTHER PUBLICATIONS

International Search Report and Written Opinion for related International Application No. PCT/US2013/070713 report dated Mar. 20, 2014.

* cited by examiner

*Primary Examiner* — Alfred J Wujciak

(74) *Attorney, Agent, or Firm* — Cantor Colburn LLP

(57) ABSTRACT

An extendable protective arm is disclosed. The arm may protect an air, fuel, oil, or electrical conduit from harsh environments or the atmosphere during use. The arm may also connect the conduit between a moveable structure adapted to reciprocate relative to a fixed structure. The arm may extend in any number of dimensions.

15 Claims, 3 Drawing Sheets

MULTI-DIMENSIONAL EXTENDING PROTECTIVE ARM

FIELD OF THE DISCLOSURE

The present disclosure generally relates to gap bridging devices and, more specifically, to extendable arms in gas turbine engines.

BACKGROUND OF THE DISCLOSURE

Various situations arise in which a moveable structure disengages from a fixed structure, yet a flow of fluid, electricity, or the like, from the fixed structure to the moveable structure is still required to enable proper functioning of the moveable structure. For example, a fuel or oil conduit, or electrical conductor may be used to provide the moveable structure with its required intake. Aerospace applications, including gas turbine engines, flaps, and the like are replete with such situations. For example, in the Joint Strike Fighter Short Take Off and Vertical Landing (STOVL) aircraft, a rear portion of the engine can rotate by up to about ninety-two degrees. Such a rotating moveable structure is typically supplied by a telescoping arm or tube. However, without adequate protection such a conduit or conductor may be damaged by harsh environmental or atmospheric conditions.

The conduit or conductor may, additionally, require support, engagement, and disengagement during operation. In that regard, an arm may be used to connect and disconnect the conduit and harness from the moveable structure as necessary as well as provide support for the conduit and conductor when doing so. However, with prior art arms, the conduit and conductor may not be adequately protected from damaging environmental conditions. In addition, prior art arms may also not allow for multi-dimensional movement, such as would be necessary in a situation in which the arm must extend around another structure to reach the desired moveable structure.

Thus, a need exists for an extendable arm assembly which protects a fluid conduit or electrical conductor from harsh environmental and atmospheric conditions, while at the same time providing multi-dimensional movement.

SUMMARY OF THE DISCLOSURE

In accordance with one aspect of the disclosure, an extendable arm assembly is disclosed. The extendable arm assembly may include a housing having a housing guide. The housing guide may define a first slide path inside the housing. There may be an intermediate arm nested inside the housing and including an intermediate arm guide. The intermediate arm guide may define a second slide path inside the intermediate arm. The extendable arm assembly may further include an actuator connected to the intermediate arm. The actuator may reciprocate the intermediate arm along the first slide path in at least one dimension. A flexible conduit may be fully contained within and extend through the housing and intermediate arm to communicate a flow.

In a refinement, the extendable arm assembly may further include a distal arm nested inside the intermediate arm.

In a further refinement, there may be a plurality of intermediate arms, the distal arm may be nested in a last intermediate arm, each intermediate arm may be nested inside an adjacent intermediate arm from the last intermediate arm to a first intermediate arm, and the first intermediate arm may be nested inside the housing.

In another further refinement, the flexible conduit may be fully contained within and extend through the distal arm, intermediate arm, and housing. A fluid outlet may be provided at a distal end of the distal arm in communication with the flexible conduit.

In yet a further refinement, the flexible conduit may be an electrical conductor and the fluid outlet may be an electrical outlet.

In yet another refinement, each guide may have a roller catch positioned at each end of the guide and a roller may be disposed in each guide, each roller may also be attached to an intermediate or distal arm.

In a further refinement, each guide may be a bearing recess containing at least one ball bearing. The ball bearings may provide smooth movement of the intermediate arm and distal arms. Each ball bearing may be retained in the bearing recess by a bearing panel. Each of the rollers may also be removed.

In another refinement, the housing guide may be curved, such that the intermediate arm may reciprocate in at least two dimensions.

In another aspect of the present disclosure, an extendable arm assembly is disclosed. The extendable arm assembly may include a housing which may have a first guide. The first guide may define a curved slide path inside the housing. An intermediate arm may be nested inside the housing and include a second guide. The second guide may define a curved slide path inside the intermediate arm. A flexible conduit may be fully contained within and extend through the housing and intermediate arm. The flexible conduit may direct a flow from a fixed structure to a moveable structure.

In a refinement, the extendable arm assembly may further include a distal arm nested inside the intermediate arm.

In a further refinement, there may be a plurality of intermediate arms, the distal arm may be nested in a last intermediate arm, each intermediate arm may be nested inside an adjacent intermediate arm from the last intermediate arm to a first intermediate arm, and the first intermediate arm may be nested inside the housing.

In another refinement, the flexible conduit may be a flexible hose which may allow a fluid to flow from the fixed structure through the extendable arm and into the moveable structure.

In yet another refinement, the actuator may be provided unitary with the fixed structure.

In yet another refinement, the actuator may be provided unitary with the moveable structure.

In yet another aspect of the present disclosure, a method of supplying a flow to a moveable structure from a fixed structure is disclosed. The method may include mounting the moveable structure onto an extendable arm assembly extending from the fixed structure, extending the extendable arm assembly to move the moveable structure away from the fixed structure, and directing the flow from the fixed structure through the extendable arm assembly to the moveable structure by a flexible conduit positioned within the extendable arm assembly.

In a refinement, the method may further include extending the extendable arm assembly with an actuator.

In another refinement, the flexible conduit may be a flexible electrical conductor and the method may further include providing the flow in the form of electricity from the fixed structure to the moveable structure.

In another refinement, the flexible conduit may be a flexible hose and the method may further include providing the flow in the form of fluid from the fixed structure to the moveable structure.

In yet another refinement, the extendable arm assembly may be curved and the method may further include extending the extendable arm assembly in a curve.

It should be understood that the drawings are not necessarily to scale and that the disclosed embodiments are sometimes illustrated diagrammatically and in partial views. In certain instances, details which are not necessary for an understanding of this disclosure or which render other details difficult to perceive may have been omitted. It should be understood, of course, that this disclosure is not limited to the particular embodiments illustrated herein.

DETAILED DESCRIPTION

Figure 1:
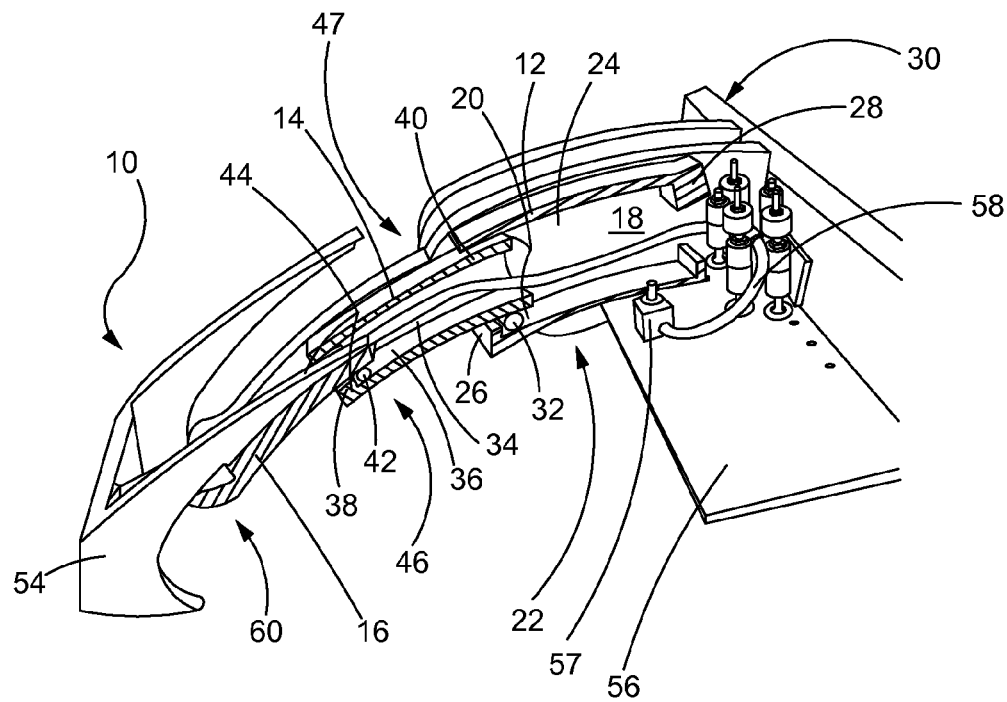
FIG. 1 is a perspective view of an extendable arm assembly constructed in accordance with the present disclosure and depicting the arm in an extended position.
Figure 2:
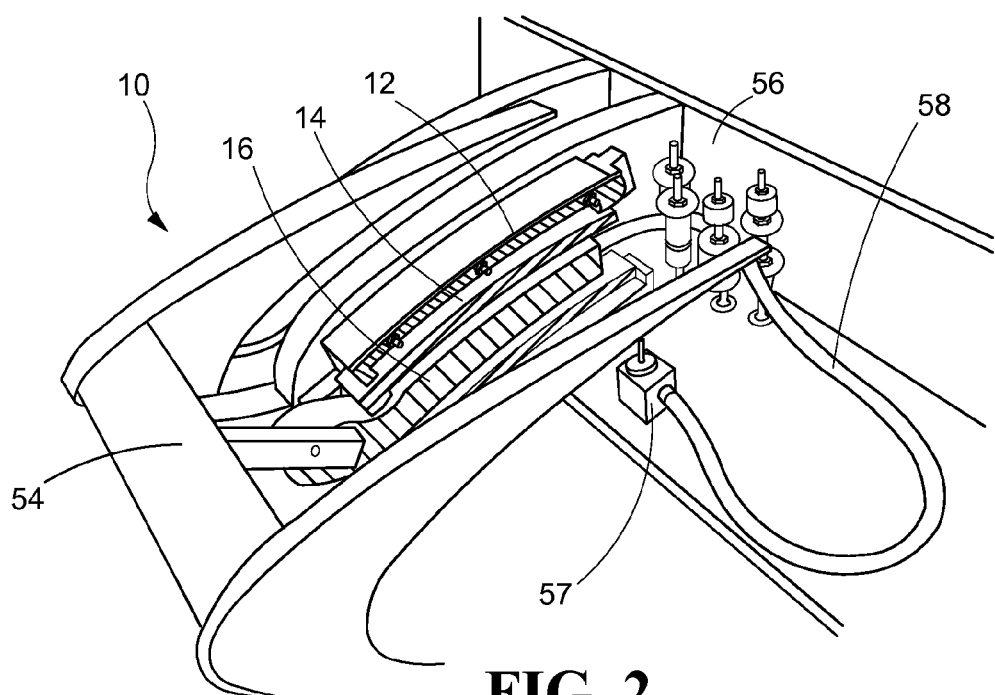
FIG. 2 is a perspective view of the extendable arm assembly from FIG. 1 but depicting the arm in a retracted position.

Referring now to the drawings, and with specific reference to FIGS. 1 and 2, an extendable arm assembly is generally referred to by numeral 10. The extendable arm assembly 10 may have a housing 12, an intermediate arm 14, and a distal arm 16. The extendable arm assembly 10 may have an extended position, as shown in FIG. 1, as well as a retracted position, as shown in FIG. 2.

The housing 12 may be of any desired shape or size and define an interior space 18. The interior space 18 may have an opening 20 at a distal end 22 of the housing 12. At least one first guide 24 may be provided inside the interior space 18 with an extended roller catch 26 positioned at the distal end 22 and a retracted roller catch 28 at a proximal end 30 of the housing 12. Each first guide 24 may define a first slide path between the roller catches 26 and 28.

An intermediate arm 14 may be positioned inside the interior space 18 when the extendable arm assembly 10 is in the retracted position. The intermediate arm 14 may have at least one roller 32 positioned in the first guide 24, which may move along the first slide path to allow the intermediate arm 14 to move in the interior space 18 from a retracted position to an extended position and back again. Each roller catch 26 and 28 may prevent the intermediate arm 14 from completely disengaging from the housing 12 by retaining the roller 32 inside the first guide 24. The roller 32 and first guide 24 combination may allow the intermediate arm 14 to move from a retracted position nested in the interior space 18 to an extended position through the opening 20. In one embodiment, the intermediate arm 14 may extend through an opening 20 at the proximal end 30 when the intermediate arm 14 is in the retracted position.

The intermediate arm 14, similar to the housing 12, also has an interior space 34 with a second guide 36, an extended roller catch 38, and a retracted roller catch 40 in the interior space 34. The second guide 36 also defines a second slide path between the roller catches 38 and 40.

The distal arm 16 may be nested inside the interior space 34 and also have at least one roller 42 positioned in the second guide 36. The roller 42 may move along the second slide path to allow the distal arm 16 to move within the interior space 34 from a retracted position to an extended position and back again. The roller catches 38 and 40 may retain the roller 42 in the second guide 36 when the distal arm 16 is in the extended position and in the retracted position. The distal arm 16 may extend through an opening 44 at a distal end 46 of the intermediate arm 14 when the distal arm 16 is in the extended position. In one embodiment, the intermediate arm 14 may also have an opening 44 at a proximal end 47 which the distal arm 16 may extend through when in the retracted position.

Figure 3:
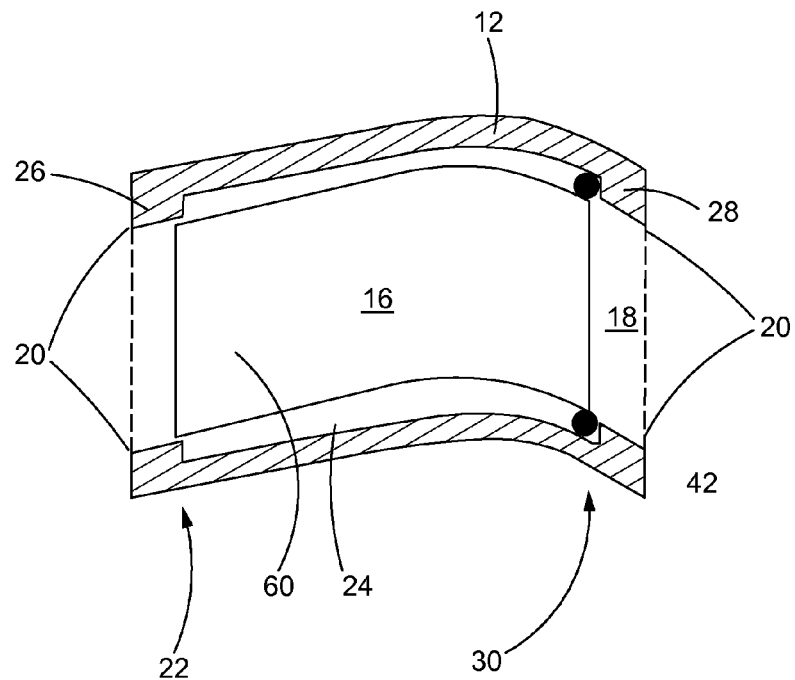
FIG. 3 is a cross-sectional view of an extendable arm assembly constructed in accordance with the present disclosure and without an intermediate arm.

In one embodiment of the present disclosure, the distal arm 16 may be nested in the housing 12 rather than in the intermediate arm 14 as in FIG. 3. In this case, at least one roller 42 may be positioned in the first guide 24. The roller 42 may be retained in the first guide 24 by the catches 26 and 28 while in the extended position and the retracted position, respectively.

Figure 4:
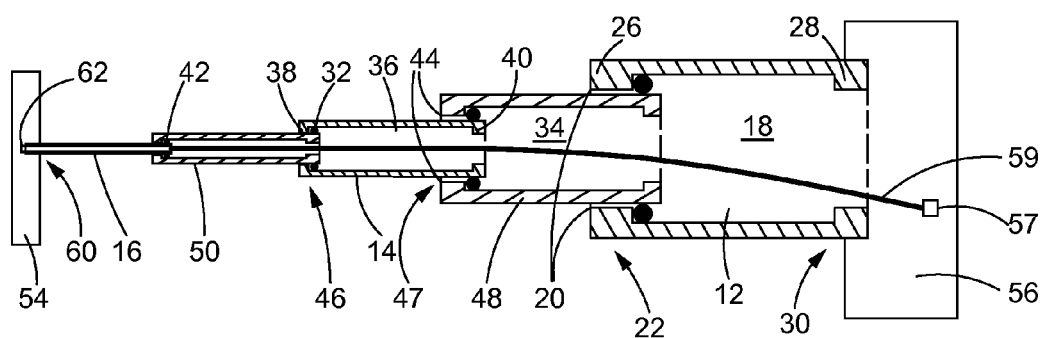
FIG. 4 is a cross-sectional view of an extendable arm assembly constructed in accordance with the present disclosure and with a plurality of intermediate arms.

In an alternate embodiment, there may be a plurality of intermediate arms 14 as in FIG. 4. A first intermediate arm 48 may be nested in the housing 12, with aech of the other intermediate arms 14 being nested inside an adjacent intermediate arm 14. The distal arm 16 may be nested in a final intermediate arm 50, which is the last intermediate arm 14 to be nested inside of another intermediate arm 14. Any desired number of intermediate arms 14 may be nested between the first intermediate arm 48 and the final intermediate arm 50.

The nested structure of the extendable arm assembly 10 allows the extendable arm assembly 10 to take up minimal space during use, such as on an aircraft where space is at a premium. Since the extendable arm assembly 10 is nested, the extended arm may be many times the length of the retracted arm.

Such an extendable arm assembly 10 may be useful in supplying fluids such as air, fuel, or oil, or in supplying electricity, or the like to a moveable structure 54 which may move away from a fixed structure 56. For example, while any number of applications exist, the fixed structure may be an aircraft wing and the moveable structure may be a flap or de-icer associated with the wing. A flexible conduit 58 may be mounted to the fixed structure 56 at junction 57 and extend through the interior spaces 18 and 34 to the distal arm 16, as in FIGS. 1, 2, 4, and 5. The flexible conduit 58 may then extend through the distal arm 16 to a distal end 60 of the distal arm 16. By extending through the interior of the extendable arm assembly 10, the flexible conduit 58 may be protected from harsh environmental and atmospheric conditions. When carrying fluids such as air, oil, and fuel, the flexible conduit 58 may be provided in the form of a flexible hose 59. The flexible hose 59 may also connect to a fluid outlet 62 which may be positioned on the distal end 60.

The extendable arm assembly 10 may move from the retracted position to the extended position separately or with assistance from the moveable structure 54. More specifically, the extendable arm assembly 10 may have a dedicated actuator to extend the extendable arm assembly 10, or the moveable structure 54 may be independently moveable and thus as the moveable structure moves, so does the assembly. The fluid outlet 62 may allow the extendable arm assembly 10 to communicate a fluid to the moveable structure 54 from the flexible hose 59 once the extendable arm assembly 10 has made contact with the moveable structure 54. Alternately, if the extendable arm assembly 10 moves with the moveable structure 54, the distal end 60 may be directly connected to the moveable structure 54. This direct connection may allow the flexible hose 59 to connect directly to the moveable structure 54 without the fluid outlet 62. However, the fluid outlet 62 may still join the flexible hose 59 with the moveable structure 54 if desired.

The extendable arm assembly 10 may also be configured to provide electricity to the moveable structure 54. This may be accomplished in the same manner as providing a fluid to the moveable structure 54, except that the flexible hose 59 may be an electrical conductor 64 and the fluid outlet 62 may be an electrical outlet 66.

Figure 5:
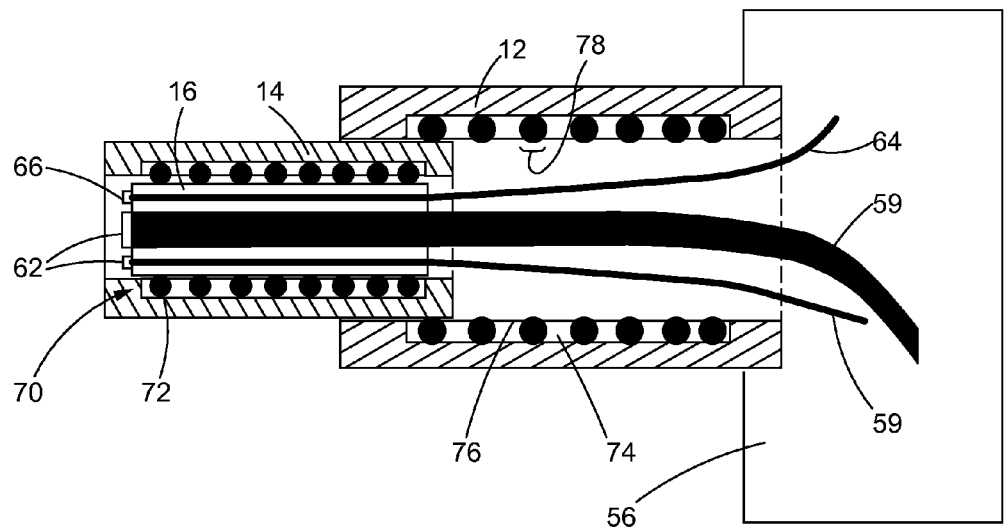
FIG. 5 is a cross-sectional view of a partially extended extendable arm assembly constructed in accordance with the present disclosure and detailing a plurality of flexible conduits and an electrical conductor extending through the extendable arm and sets of bearings.

Additionally, a plurality of flexible hoses 59 or electrical conductors 64 may extend through the extendable arm assembly 10, as in FIG. 5, to provide a plurality of fluids or electricity to the moveable structure 54, provided there is sufficient room inside the extendable arm assembly 10 for the plurality of hoses 59 or conductors 64.

As shown in FIG. 4, the extendable arm assembly 10 may extend in only one dimension. Each arm 14 and 16 may extend in the same direction as every other arm 14 and 16 to accomplish a one-dimensional extension. However, the extendable arm assembly 10 may also extend in a plurality of dimensions. To accomplish this, each guide 24 and 36 may define a multi-dimensional curve or curved slide path inside the housing 12 and intermediate arm 14, respectively. Additionally, each intermediate arm 14 and distal arm 16 may have a multi-dimensional curved structure, such as in FIG. 1. The curved guides, 24 or 36, or the curved shapes of the arms, 14 or 16, may allow the extendable arm assembly 10 to extend in multiple dimensions.

Figure 6:
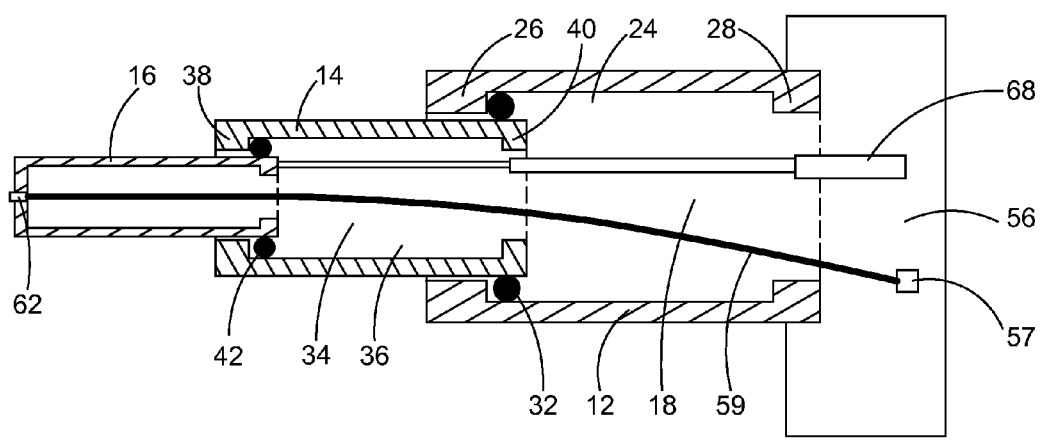
FIG. 6 is a cross-sectional view of an extendable arm assembly constructed in accordance with the present disclosure and extended by an actuator.

As indicated above, the extendable arm assembly 10 may move from the retracted position to the extended position and back again under the influence of an actuator 68, such as, but not limited to, a pneumatic piston or an electronically controlled roller. As in FIG. 6, the actuator 68, a pneumatic piston in this case, may be connected to the distal arm 16 to reciprocate the extendable arm assembly 10. However, the actuator 68 may be connected to the extendable arm assembly 10 in alternate configurations as well. Every arm 14 and 16 may be extended simultaneously or in any desired order of progression. One such ordered progression may be extending all intermediate arms 14 starting with the first intermediate arm 48 and progressing down the nested arms 14 until reaching the final intermediate arm 50 and then extending the distal arm 16. It is to be understood that the presented progression is only one such progression possible and any desired progression is possible. To return the extendable arm assembly 10 to the retracted position the actuator 68 may simply perform the reverse action performed in extending the extendable arm assembly 10. However, alternate methods of retracting the extendable arm assembly 10 are also possible such as, but not limited to, retracting the arm by compression due to the moveable structure 54 moving close to the fixed structure 56 and compressing the extendable arm assembly 10 in the process.

Alternatively, as also indicated above, the extendable arm assembly 10 may be assisted in extending and retracting by independent movement of the moveable structure 54. The distal arm 16 may be connected to the moveable structure 54, as in FIGS. 1 and 2, such that when the moveable structure 54 moves away from the fixed structure 56 the extendable arm assembly 10 may be extended. The movement of the moveable structure 54 close to the fixed structure 56 may cause the extendable arm assembly 10 to be retracted. This configuration may allow the extendable arm assembly 10 to remain in contact with both the moveable structure 54 and the fixed structure 56 at all times. In conjunction with the flexible hose 59 or electrical conductor 64, the extendable arm assembly 10 may provide and protect a constant supply of a fluid or electricity to the moveable structure 54 from the fixed structure 56.

Finally, rather than a guide and roller system for providing movement to each of the arms 14 and 16, at least one set of bearings 70 may be positioned in the interior spaces 18 and 34, as in FIG. 5. Each set of bearings 70 may, for example, include at least one ball bearing 72 positioned in a bearing recess 74 in either the housing 12 or intermediate arm 14. The ball bearings 72 may be retained inside the bearing recess 74 by a bearing panel 76 having at least one opening 78 to allow frictional communication between the ball bearings 72 and either the intermediate arm 14 or the distal arm 16. The set of bearings 70 may allow the intermediate arm 14 or distal arm 16 to move in the interior space 18 or 34, respectively.

INDUSTRIAL APPLICABILITY

From the foregoing, it can be seen that the technology disclosed herein has industrial applicability in a variety of settings such as, but not limited to, connecting an air, oil, or fuel conduit, or electrical conductor between a moveable structure and a fixed structure. This improvement over the prior art may protect the air, oil, or fuel conduit, or electrical conductor from harsh environments and the atmosphere. For example, the teachings of the present disclosure may find particular applicability in aerospace applications such as, but not limited to, gas turbine engines, nacelles, wings, flaps and the like. Additionally, this improvement may allow for said conduits and conductors to be connected to moveable structures previously inaccessible due to intervening structures in that the present disclosure also provides an extending arm assembly which is able to move in multiple dimensions.

It is intended that the scope of the invention not be limited by the embodiments presented herein, but that the invention will include all equivalents and embodiments falling within the scope of the appended claims as well.

What is claimed is:

1. An extendable arm assembly configured for use with an aircraft wing, comprising:
  a housing secured to the aircraft wing, the housing having a first curved guide, the first curved guide defining a first curved slide path inside the housing;
  an intermediate arm nested inside the housing and including an second guide, the second guide defining a second slide path inside the intermediate arm, the intermediate arm including a distal arm nested inside, each guide including a roller catch positioned at each end of the guide and a roller disposed in each guide, each roller attached to one of the intermediate arm and the distal arm, the intermediate arm configured to reciprocate along the first curved slide path in at least two dimensions; and
  a flexible conduit fully contained within and extending through the housing and intermediate arm to communicate a flow.

2. The extendable arm assembly of claim 1, wherein there are a plurality of intermediate arms, the distal arm is nested in a last intermediate arm, each intermediate arm is nested inside an adjacent intermediate arm from the last intermediate arm to a first intermediate arm, and the first intermediate arm is nested inside the housing.

3. The extendable arm assembly of claim 1, wherein the flexible conduit is fully contained within and extending through the distal arm, intermediate arm, and housing, and a fluid outlet is provided at a distal end of the distal arm in communication with the flexible conduit.

4. The extendable arm assembly of claim 3, wherein the flexible conduit is an electrical conductor.

5. The extendable arm assembly as in claim 1, wherein flexible conduit communicates a flow to a structure moveable with respect to the aircraft wing.

6. The extendable arm assembly as in claim 5, wherein structure is a flap.

7. The extendable arm assembly as in claim 5, wherein structure is a deicer.

8. The extendable arm assembly as in claim 5, wherein the flow is one of: air; fuel; oil; and electricity.

9. The extendable arm assembly as in claim 8, wherein the structure is one of: a flap; and a deicer.

10. An extendable arm assembly configured for use with an aircraft wing, comprising:
   a housing secured to the aircraft wing, having a first curved guide, the first curved guide defining a first curved slide path inside the housing;
   an intermediate arm nested inside the housing and including an second guide, the second guide defining a second slide path inside the intermediate arm, the intermediate arm including a distal arm nested inside, each guide including a roller catch positioned at each end of the guide and a roller disposed in each guide, each roller attached to one of the intermediate arm and the distal arm, the intermediate arm configured to reciprocate along the first curved slide path in at least two dimensions; and
   a flexible conduit fully contained within and extending through the housing and intermediate arm to communicate a flow, wherein each guide is a bearing recess containing at least one roller, wherein each roller is a ball bearing for smooth movement of the intermediate arm and distal arms, each ball bearing retained in the bearing recess by a bearing panel.

11. An extendable arm assembly configured for use with an aircraft wing, comprising:
   a housing having an opening and a first guide, the guide defining a curved slide path inside the housing and the curved slide path following at least two dimensions;
   an intermediate arm nested inside the housing and including an opening and a second guide, the second guide defining a curved slide path inside the intermediate arm; and
   a flexible hose fully contained with and extending through the housing and intermediate arm to direct a flow from the aircraft wing through the extendable arm assembly and into a movable structure associated with the aircraft wing.

12. The extendable arm assembly of claim 11, further including a distal arm nested inside the intermediate arm.

13. The extendable arm assembly of claim 12, wherein there are a plurality of intermediate arms, the distal arm is nested in a last intermediate arm, each intermediate arm is nested inside an adjacent intermediate arm from the last intermediate arm to a first intermediate arm, and the first intermediate arm is nested inside the housing.

14. The extendable arm assembly as in claim 11, wherein the flow is one of: air; fuel; oil; and electricity.

15. The extendable arm assembly as in claim 14, wherein the moveable structure is one of: a flap; and a deicer.

* * * * *